I. T. LEAGER.
SHOCK ABSORBER.
APPLICATION FILED MAR. 4, 1919.
1,356,533.
Patented Oct. 26, 1920.
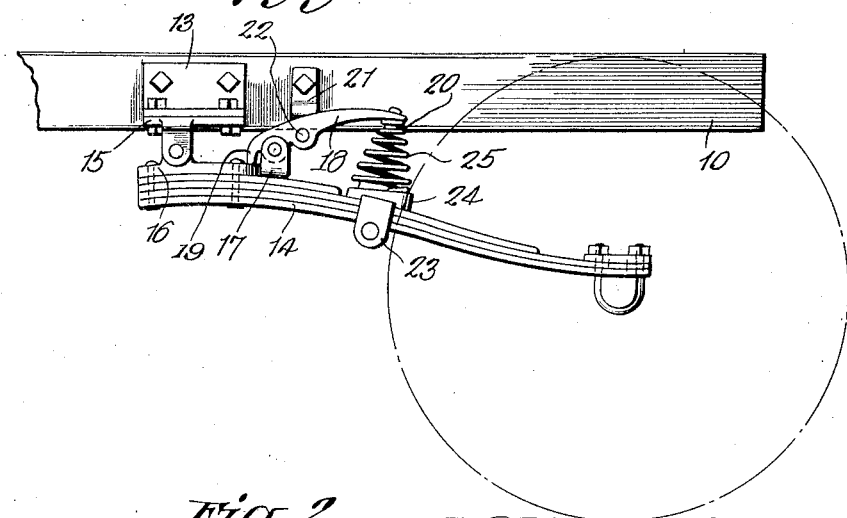
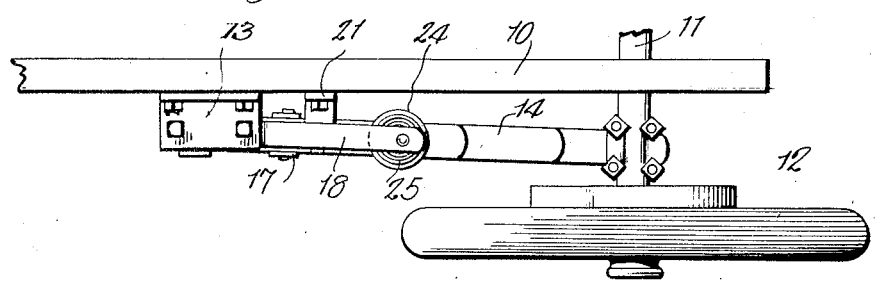
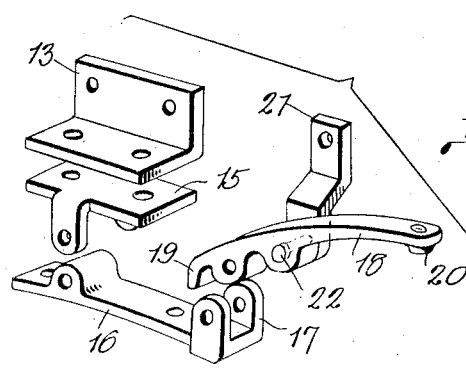
INVENTOR.
Ira T. Leager;
BY
Lacey & Lacey
ATTORNEYS

UNITED STATES PATENT OFFICE.

IRA T. LEAGER, OF RIDGELY, MARYLAND.

SHOCK-ABSORBER.

1,356,533.   Specification of Letters Patent.   Patented Oct. 26, 1920.

Application filed March 4, 1919. Serial No. 280,511.

*To all whom it may concern:*

Be it known that I, IRA T. LEAGER, citizen of the United States, residing at Ridgely, in the county of Caroline and State of Maryland, have invented certain new and useful Improvements in Shock-Absorbers, of which the following is a specification.

This invention relates to an improved shock absorber for motor vehicles, being especially designed for use in connection with vehicle springs of the semi-cantaliver type, and has as one of its objects to provide a device of this character which will act to yieldably resist extreme flexing movement of the spring such as usually results from severe jolts or jars upon the vehicle when passing over rough roads.

The invention has a further object to provide a shock absorber which will be mounted to coact with the vehicle spring for normally sustaining the load and so arranged upon the spring that the load will be distributed through the auxiliary cushioning spring of the device directly to the intermediate portion of the spring of the vehicle so as to thereby obtain a maximum cushioning effect.

And the invention has as a still further object to provide a construction wherein a pivotal mounting for the vehicle spring will be employed so that such spring may rock at its inner end when compressed but wherein the absorber will lock the spring against upward movement and rigidly support the spring to counteract rebound of the vehicle body.

Other and incidental objects will appear during the course of the detailed description of the invention. In the drawings, wherein I have illustrated the preferred embodiment of the invention, and wherein similar reference characters designate corresponding parts throughout the several views:

Figure 1 is a fragmentary side elevation showing my improved device applied to a semi-cantaliver rear spring of a conventional type of vehicle, Fig. 2 is a fragmentary plan view showing the manner in which the device overlies the spring, and Fig. 3 is a detail perspective view illustrating the device detached and having the parts thereof separated from each other.

Referring now more particularly to the drawings, I have shown one side bar of the chassis of a conventional type of motor vehicle at 10. The rear axle of the vehicle is indicated at 11 and one rear wheel at 12. Connected to the side bar is a bracket 13 to which is ordinarily secured the inner end of one of the rear springs 14 of the vehicle. The outer end of the spring 14 is attached in the customary manner to the rear axle 11 of the vehicle to rock with respect thereto. In carrying the invention into effect I employ a hinge plate 15 suitably connected to the bracket 13 and provided with spaced depending lugs between which is pivoted adjacent one end a coacting elongated hinge plate 16. Rigidly secured at its inner end to this hinge plate is the inner end of the spring 14. Upstanding from the hinge plate 16 at its outer end are spaced lugs or ears 17 between which is received a shock absorbing lever 18 pivotally connected adjacent its inner end with the lugs for movement in a plane with the hinge plate. At its inner end this lever is provided with a laterally and downwardly directed terminal 19 adapted to engage the plate for limiting the outer end of the lever in its upward pivotal movement and riveted or otherwise secured to the outer end of the lever is a centering lug 20. Bolted or otherwise secured to the side bar 10 in the rear of the bracket 13 and spaced somewhat from said bracket is a second bracket or arm 21, the lower end portion of which is offset to extend in lateral spaced relation to the side bar and carries a suitable pivot pin 22 upon which the shock absorbing lever is mounted to rock. In this connection it will be observed that the lever is fulcrumed at a point nearer to its inner end than to its outer end while, at the same time, the pivot pin lies in a plane in the rear of the pivotal connection between the lever and the hinge plate 16. Embracing the spring 14 medially thereof is a clip 23 to which is secured a beveled disk or block 24 providing a flat seat for the lower larger end of a volute shock cushioning spring 25 held upon the seat, as shown in Fig. 1, by a reduced portion upstanding therefrom. At its smaller end, the spring is engaged around the centering lug 20 of the lever 18 and is thus connected with the lever.

As will now be readily understood in view of the preceding description, the plates 15 and 16 will support the main spring 14 for rocking movement at its inner end so that the load acting to flatten the spring will tend to swing the outer end of the hinge plate 16 upwardly and accordingly raise the inner end of the cushioning lever 18 for moving the outer end thereof downwardly to compress the auxiliary spring 25, while the bracket 21 will be shifted downwardly with the side bar 10 to also depress the forward end of the lever and compress the auxiliary spring. Thus, the main spring 14, being the heaviest of the two springs and consequently offering greater resistance to impact, will act to cushion the severer shocks when the vehicle is passing over rough roads while the auxiliary spring, being relatively lighter and consequently supple, will act to interrupt the lesser shocks and quickly recurring vibrations so that the two springs will coact for effectively cushioning the load. Furthermore, owing to the connection between the lever 18 and the spring 14 at the outer end of the hinge plate and accordingly at a distance in the rear of the butt end of the spring, a portion of the load will be transmitted through the bracket 21 and through the cushioning lever to the intermediate portion of the spring and the load center thus shifted rearwardly from the point of pivotal connection of the spring with its supporting bracket. Consequently, the intermediate and more flexible portion of the spring, as compared with the inner thickest end of the spring, will receive the major portion of the load for cushioning the load with correspondingly increased effectiveness. This effect is further enhanced in connection with the auxiliary spring 25 which is mounted to transmit the thrust from the cushioning lever therethrough to the spring 14 at a point substantially midway of its ends. The outer flexible extremity of the spring 14, together with the relatively supple auxiliary spring, will thus coact for cushioning the short sudden shocks to which a vehicle is so often subjected. Upon the rebound of the vehicle body, the bar 10 will move upwardly to accordingly swing the inner end of the cushioning lever downwardly and engage the terminal 19 of said lever with the hinge plate 16 to prevent further swinging of the lever when a direct upward pull against the spring 14 will be had. I accordingly provide a highly effective construction for the purpose set forth and a device which may be readily installed upon vehicles using springs of the type indicated or springs of similar type, without the necessity for material structural change in the usual mounting of the springs.

Having thus described the invention, what is claimed as new is:

1. A shock absorber for vehicles including in combination with a load carrying spring, means for pivotally connecting said spring to a vehicle, a shock absorbing lever pivoted upon said means and supported for movement with respect to the spring, and an auxiliary cushioning spring interposed between the lever and the load carrying spring.

2. A shock absorber for vehicles including in combination with a load carrying spring, means pivotally supporting said spring at its point of connection with a vehicle frame, a shock absorbing lever pivoted upon said means at a point in a plane in the rear of the first point, means for connecting the lever to a vehicle frame and pivotally supporting the lever at a point lying in a plane in the rear of the second point, and an auxiliary shock absorbing spring interposed between the lever and the load carrying spring.

3. A shock absorber for vehicles including in combination with a load carrying spring, coacting plates for pivotally connecting said spring to a vehicle frame, one of the plates being engaged with the spring, a pivotally mounted shock absorbing lever supported for movement with respect to the spring and also pivoted upon said plate, and an auxiliary shock absorbing spring interposed between the lever and the first spring.

4. A shock absorber for vehicles including in combination with a main load carrying spring, a fixed plate, an elongated movable hinge plate pivotally connected adjacent one end with said first mentioned plate and secured to said spring, a pivotally mounted shock absorbing lever supported for bodily movement with respect to the spring and pivotally connected adjacent one end with the opposite end of said movable hinge plate, and an auxiliary shock absorbing spring interposed between the opposite end of said lever and said first mentioned spring.

5. A shock absorber for vehicles including in combination with a main load carrying spring, spaced fixed brackets, means pivotally connecting said spring with one of said brackets, a shock absorbing lever pivotally mounted upon the other of said brackets and swingingly connected adjacent one end with said spring, and an auxiliary shock absorbing spring interposed between the opposite end of said lever and said first mentioned spring.

6. A shock absorber for vehicles including in combination with a load carrying spring, and a vehicle frame supported thereby, a pivoted shock absorbing lever carried by the frame, means pivotally connecting the lever with the spring, and an auxiliary cushioning spring interposed between the lever and the first spring.

7. A shock absorber for vehicles including in combination with a load carrying spring, a pivotally mounted shock absorbing lever supported for movement with respect to the spring, means pivotally connecting the lever at one side of its pivotal center to the spring, and an auxiliary cushioning spring bearing between the first spring and lever at the other side of its pivotal center.

In testimony whereof I affix my signature.

IRA T. LEAGER. [L. S.]